United States Patent
Ekl et al.

(10) Patent No.: US 7,058,030 B2
(45) Date of Patent: Jun. 6, 2006

(54) METHOD FOR PERFORMING A SEAMLESS HANDOFF IN A COMMUNICATION SYSTEM

(75) Inventors: Randy L. Ekl, Lake Zurich, IL (US); George Popovich, Palatine, IL (US); Shmuel Silverman, Buffalo Grove, IL (US); Robert D. LoGalbo, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 139 days.

(21) Appl. No.: 10/622,048

(22) Filed: Jul. 17, 2003

(65) Prior Publication Data

US 2005/0013276 A1     Jan. 20, 2005

(51) Int. Cl.
*H04Q 7/00* (2006.01)

(52) U.S. Cl. ............ 370/328; 370/310; 370/312; 370/318; 370/331; 370/332; 370/333; 455/421; 455/422.1; 455/433; 455/436; 455/437

(58) Field of Classification Search ............ 370/310, 370/2, 311, 312, 318, 328, 331, 332, 333; 455/421, 422.1, 433, 436, 437, 439, 442, 455/443, 447
See application file for complete search history.

(56) References Cited

U.S. PATENT DOCUMENTS

| 5,175,867 | A  | * | 12/1992 | Wejke et al. | 455/439 |
| 6,360,264 | B1 | * | 3/2002  | Rom          | 709/227 |
| 2002/0085719 | A1 | * | 7/2002  | Crosbie   | 380/248 |
| 2003/0190916 | A1 | * | 10/2003 | Celedon et al. | 455/437 |

* cited by examiner

*Primary Examiner*—Wellington Chin
*Assistant Examiner*—Raj Jain
(74) *Attorney, Agent, or Firm*—Terri S. Hughes; Indira Saladi

(57) ABSTRACT

Disclosed is a method for performing handoff in a communication system of access points and a mobile station, where the mobile station is associated with a first access point. The first access point receives a first transmission at a first signal quality from the mobile station and receives a second transmission that indicates a second signal quality at which a second access point is receiving transmissions from the mobile station. The first access point compares the first signal quality with the second signal quality and when the second signal quality is greater than the first signal quality, the first access point signals the second access point to initiate a handoff with the mobile station. The second access point responds by sending a disassociation message to the mobile station to disassociate with the first access point, wherein the disassociation message is addressed as if it originated from the first access point.

15 Claims, 3 Drawing Sheets

METHOD FOR PERFORMING A SEAMLESS HANDOFF IN A COMMUNICATION SYSTEM

FIELD OF THE INVENTION

The present invention relates generally to a method for performing a seamless handoff in a communication system.

BACKGROUND OF THE INVENTION

Handoff mechanisms in current communication systems, such as 802.11 wireless local area network ("WLAN"), are simple, but slow. Slow handoffs may result in large numbers of transmissions being delayed and/or lost during handoff from one access point ("AP") to another. This problem can become very severe if a mobile station ("MS") is traveling from one AP coverage area to another at vehicular speeds.

The standards-based solution to this problem consists of the MS determining that the signal quality from the currently associated AP has dipped below some threshold value, or worse yet, that the MS tries to transmit a transmission to an AP, and all retries are exhausted. The decision process in the MS can take several hundred milliseconds (e.g., 600+). At that point, the MS begins searching for additional APs that it can associate with. Once a different AP is found, the MS associates with it and the handoff is complete.

A major disadvantage to this standards-based approach is that the MS hangs on to the old AP for quite a while before seeking a new AP with better signal quality. Thus, while the standards-based approach may be simple, it is not conducive to seamless handoffs.

Thus, there exists a need for a method for performing a seamless handoff.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

Figure 1:
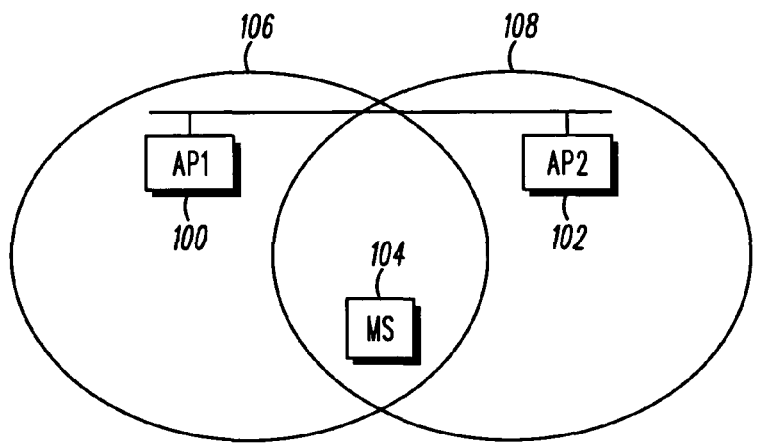
FIG. 1 illustrates a system topology in accordance with the present invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention reduces handoff delays from one AP to another by exploiting the fact that adjacent/neighboring APs are likely to "hear"/receive a transmission from a MS well before the MS reaches a threshold where it decides the signal quality from its currently associated AP is poor enough to trigger the handoff procedure. Thus, the present invention adds additional AP processing and inter-AP messaging to the handoff procedure that provides for a more seamless (less delay, fewer dropped transmissions, fewer out of order transmissions, or the like) handoff for subscriber units. It should be noted, however, that in a first embodiment of the present invention, modifications are not required to be made to the MS for the purposes of improving the handoff decision process (i.e., the present invention is transparent to the MS); however, in an alternative embodiment of the present invention, modifications are required to be made to the MS for the purposes of improving the handoff decision process.

FIG. 1 illustrates a communication network having a first AP ("AP1") 100, a second AP ("AP2") 102, and the MS 104. The coverage area of AP1 100 is represented by circle 106, and the coverage area for AP2 102 is represented by circle 108. The present invention assumes that the AP1 100, AP2 102, and the MS 104 are functioning properly, and the MS 104 is currently registered and associated with AP1 100.

Figure 2:
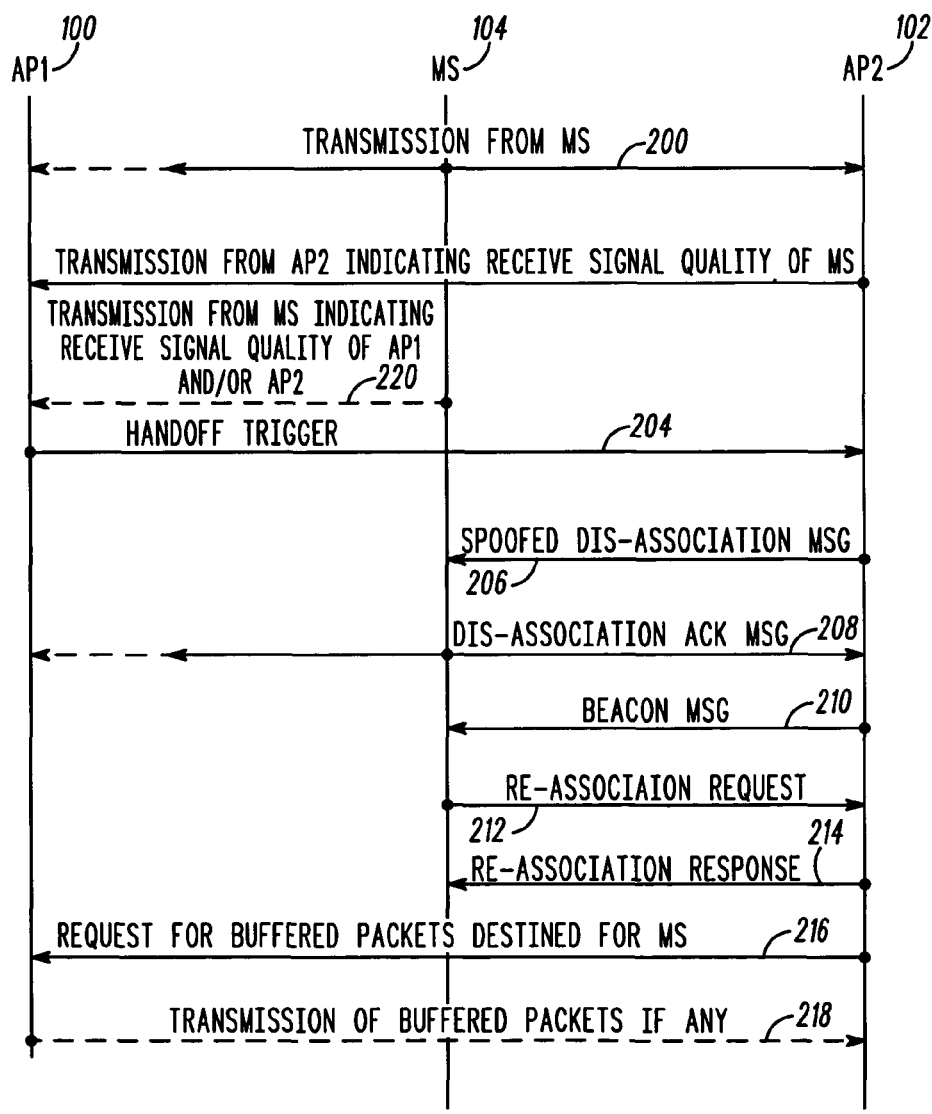
FIG. 2 illustrates a message sequence flow diagram in accordance with the preferred embodiment of the present invention.
Figure 3:
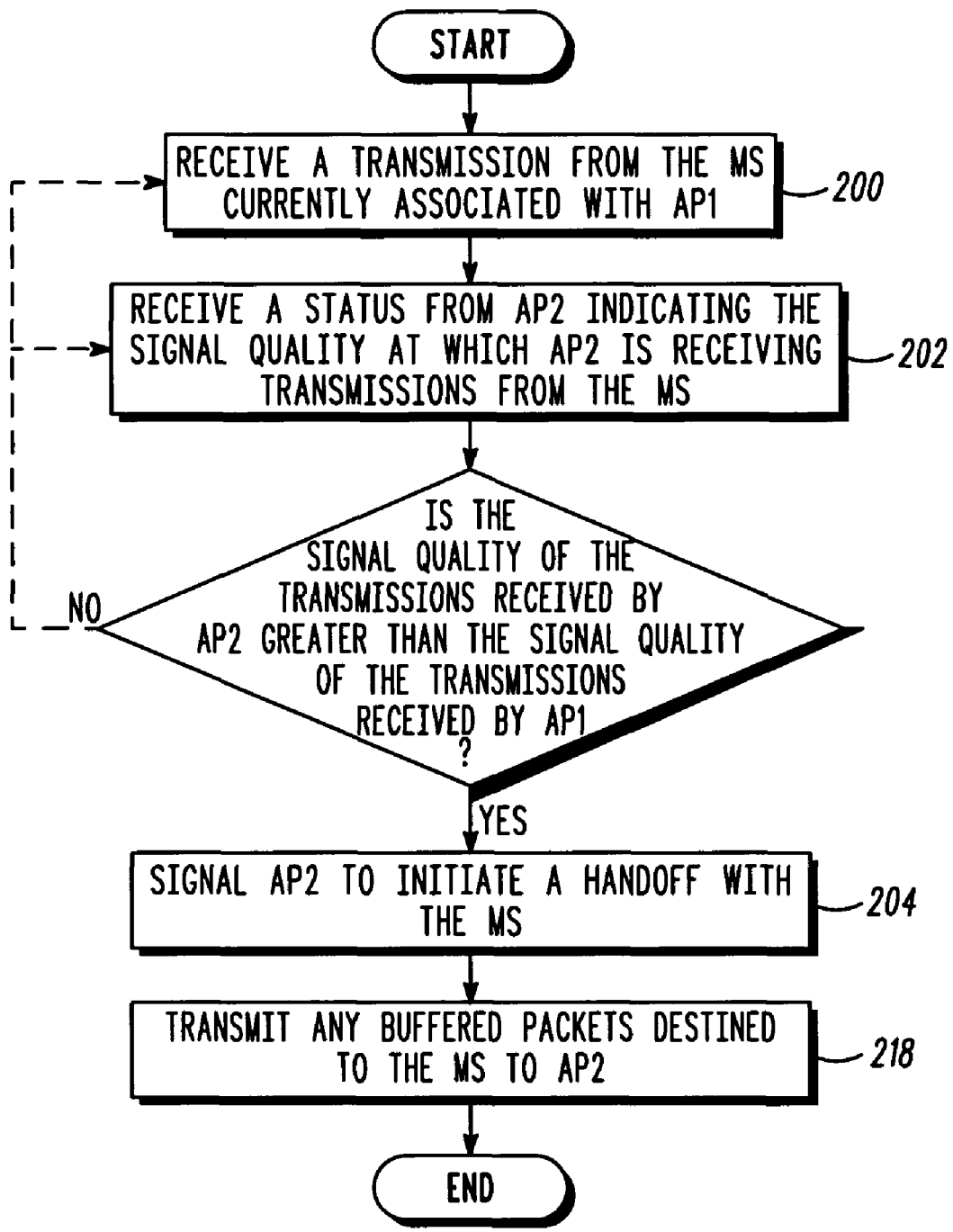
FIG. 3 illustrates a flowchart depicting the operation of the first access point in accordance with the preferred embodiment of the present invention.
Figure 4:
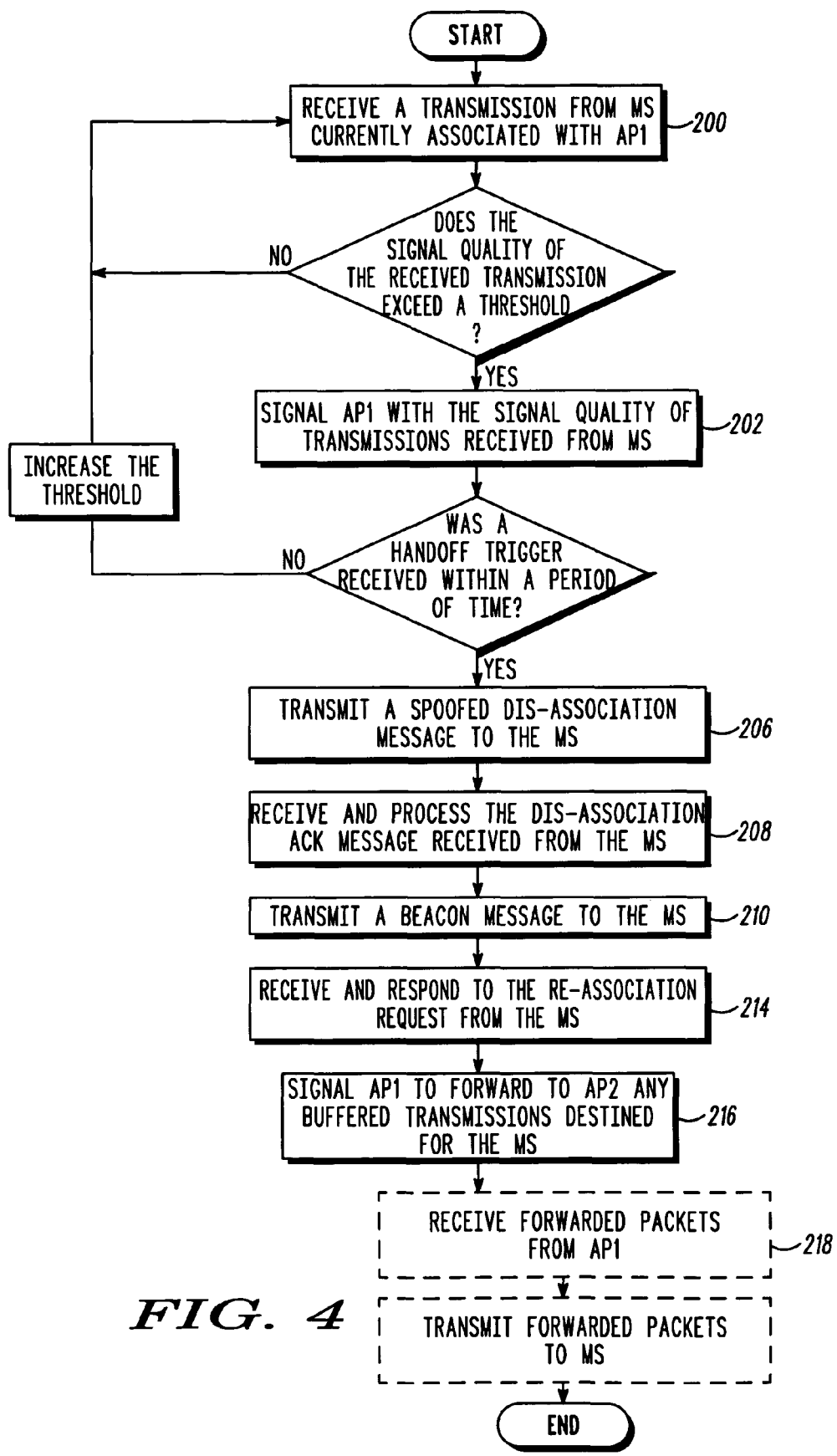
FIG. 4 illustrates a flowchart depicting the operation of the second access point in accordance with the preferred embodiment of the present invention.

FIG. 2 illustrates an example of a message sequence flow diagram of the operation of the communication network in accordance with the preferred embodiment of the present invention. As the MS 104 starts to move out of the coverage area 106 of AP1 100 and into the coverage area 108 of AP2 102, AP2 102 will begin to receive transmissions from the MS 104 (200). It should be noted that the MS 104 may or may not still be within the coverage area 106 of AP1 100. When AP2 102 starts to receive transmissions from the MS 104, AP2 102 compares the signal quality of the transmission to a threshold in accordance with the present invention. If the signal quality of the received transmission exceeds the threshold, AP2 102, or some other entity, signals AP1 100 that AP2 102 is receiving transmissions from the MS 104 currently associated with AP1 100 at the given signal quality (202). AP1 100 compares the signal quality of transmissions received by AP2 102 to its own, and if AP1 100 determines that the signal quality of transmissions received by AP2 102 is better than its own, AP1 100 transmits a "handoff trigger" to AP2 102 that signals AP2 to initiate a handoff with the MS 104 (204). It is important to note that the signal quality of the transmissions received by a device may be based on, but is not limited to, signal strength, slicer error, a Viterbi path metric, cyclic redundant check errors, or the like.

AP2 102 processes the "handoff trigger" received from AP1 100 and commits to associating with the MS 104 by transmitting a disassociation message to the MS 104, with the message addressed as if the disassociation message originated from AP1 100 (206); such a technique is known to those individuals ordinarily skilled in the art as "spoofing", which is implemented in the present invention so that a standard (off-the-shelf) MS 104 will accept the disassociation message from AP2 102. The MS 104 transmits a disassociation acknowledgement back to what it believes is AP1 100 (208); if AP1 100 receives the disassociation acknowledgement, AP1 100 ignores the acknowledgement.

AP2 102 receives and processes the disassociation acknowledgement from the MS 104 even though it is addressed to AP1 100. Upon receipt of the disassociation acknowledgement from the MS 104, AP2 102 transmits a beacon message (210), which in turn triggers the MS 104 to re-associate with AP2 102.

Upon receipt of the beacon message from AP2 102, the MS 104 transmits a re-associate request to AP2 102 (212). AP2 102 responds with a re-associate response to the MS 104 (214). Once the response is received, the MS 104 begins directing its outgoing transmissions to AP2 102. AP2 102 immediately signals AP1 100 to forward to AP2 102 any buffered packets destined to the MS 104 (216), and AP1 100 forwards to AP2 102 any buffered packets destined to the MS 104 (218). It should be noted that AP1 100 could forward to AP2 102 any buffered packets destined to the MS 104 at any time after AP2 102 commits to associate with the MS 104.

Further optimizations can be added to the present invention to reduce the signaling overhead between AP1 100 and AP2 102 if the MS 104 happens to be within overlapping coverage areas for an extended period of time. For example, if AP1 100 does not signal AP2 102 to initiate a handoff with the MS 104 within a predetermined time period after being notified of the signal quality at which AP2 102 is receiving transmissions from the MS 104, AP2 102 can interpret the non-response as meaning that the signal quality of the transmissions received by AP2 102 from the MS 104 was not strong enough to warrant a handoff. As a result, when AP2 102 receives additional transmissions from the MS 104, AP2 102 can hold off signaling AP1 100 of the presence of the MS 104 unless the signal quality has improved, preferably for some fixed amount of time, or by some percentage or threshold, over previously received transmissions.

In an alternative embodiment, before AP1 100 signals AP2 102 to initiate a handoff with the MS 104, AP1 100 takes into consideration the signal quality of transmissions received by the MS 104 from AP2 102 (220). In this alternative embodiment, in addition to AP2 102 indicating to AP1 100 the signal quality of transmissions received by AP2 102 from the MS 104, the MS 104 also indicates to AP1 100 the signal quality of transmissions received by the MS 104 from AP2 102. Taking into consideration the perspective of the MS 104, particularly the signal quality of transmissions the MS 104 receives from neighboring APs, prior to instructing a particular AP to initiate a handoff with the MS 104, improves the handoff decision process because the inbound (i.e., from the MS to the AP) and outbound (i.e., from the AP to the MS) radio frequency communication paths are not necessarily symmetrical; in other words, just because AP2 102 is receiving transmissions transmitted by the MS 104 at a given signal quality does not mean that the MS 104 is receiving transmission transmitted by AP2 102 at the same or similar signal quality. Thus, AP1 will instruct AP2 102 to initiate a handoff with the MS 104 when the signal quality of the transmissions received by the MS 104 from AP2 is greater than the signal quality of the transmissions received by the MS 104 from AP1 100, and the signal quality of the transmissions received by AP2 102 from the MS 104 is greater than a threshold in accordance with the alternative embodiment of the present invention; alternatively, AP1 100 will instruct AP2 102 to initiate a handoff with the MS 104 when the signal quality of the transmissions received by AP2 102 from the MS 104 is greater than the signal quality of the transmissions received by AP1 100 from the MS 104, and the signal quality of the transmissions received by the MS 104 from AP2 102 is greater than a threshold in accordance with the alternative embodiment of the present invention; in yet a further alternative, AP1 100 will instruct AP2 102 to initiate a handoff with the MS 104 when the signal quality of the transmissions received by AP2 102 from the MS is greater than the signal quality of the transmissions received by AP1 100 from the MS 104, and the signal quality of the transmissions received by the MS 104 from AP2 102 is greater than the signal quality of the transmissions received by the MS 104 from AP1 100 in accordance with the alternative embodiment of the present invention. It will be appreciated by those individuals skilled in the art that other combinations of signal quality may be used to determine whether AP1 100 will instruct AP2 102 to initiate a handoff with the MS 104, other than those listed above, and still remain within the spirit and scope of the present invention.

It should be noted that, in accordance with the present invention, the devices apply hysteresis as known to those individuals skilled in the art, particularly when computing signal quality values and/or comparing signal quality values to each other and/or a threshold. Further, it should be noted that the present invention is backwards compatible in that APs implementing the present invention can be mixed with, for example, standard 802.11 APs within the same system. For example, if an enhanced AP (i.e., an AP implementing the present invention) attempts to signal a standard AP (i.e., an AP not implementing the present invention) that a handoff is possible, the standard AP will ignore the transmission since it is unrecognizable. The lack of a response will indicate to the enhanced AP that the particular AP does not support this feature, and thus, will not transmit any subsequent "handoff advertisements" to this particular AP. This does not, however, preclude the completion of the handoff. For example, if the signal quality at AP2 102 exceeds a certain threshold (or other metric that indicates that a handover should occur), then AP2 102 may determine it does not need to receive a handoff trigger from AP1 100, and may proceed with the "spoofed" disassociation message to the MS 104.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. In a communication system comprising a plurality of access points and a mobile station, wherein the mobile station is currently associated with a first access point, a method comprising the steps of, at the first access point:

receiving a first transmission at a first signal quality from the mobile station;

receiving a second transmission that indicates a second signal quality at which a second access point is receiving transmissions from the mobile station;

comparing the first signal quality with the second signal quality; and when the second signal quality is greater than the first signal quality, signaling the second access point to initiate a handoff with the mobile station, wherein the second access point responds by sending a disassociation message to the mobile station to disassociate with the first access point, wherein the disassociation message is addressed as if it originated from the first access point.

2. The method of claim 1 further comprising the step of transmitting to the second access point any buffered packets destined to the mobile station.

3. The method of claim 1 wherein the second transmission is received from the second access point.

4. The method of claim 1 further comprising the step of receiving a third transmission that indicates a third signal quality at which the mobile station is receiving transmissions from the second access point.

5. The method of claim 4 further comprising signaling that is performed when the third signal quality exceeds a threshold.

6. The method of claim 4 wherein the third transmission further indicates a fourth signal quality at which the mobile station is receiving transmissions from the first access point.

7. The method of claim 6 wherein the step of signaling is performed when the third signal quality is greater than the fourth signal quality.

8. The method of claim 4 wherein the third transmission is received from the mobile station.

9. The method of claim 4 wherein the second transmission is received from the second access point, and wherein the third transmission is received from the mobile station.

10. In a communication system comprising a plurality of access points and a mobile station, wherein the mobile station is currently associated with a first access point, a method comprising the steps of, at the first access point:
   receiving at least one transmission that indicates a first signal quality at which the mobile station is receiving transmissions from the first access point, a second signal quality at which the mobile station is receiving transmissions from a second access point, and a third signal quality at which the second access point is receiving transmissions from the mobile station;
   comparing the first signal quality with the second signal quality;
   comparing the third signal quality against a threshold; and
   when the second signal quality is greater than the first signal quality and when the third signal quality exceeds the threshold, signaling the second access point to initiate a handoff with the mobile station, wherein the second access point responds by sending a disassociation message to the mobile station to disassociate with the first access point, wherein the disassociation message is addressed as if it originated from the first access point.

11. The method of claim 10 wherein the first signal quality and the second signal quality are received via at least a first transmission from the mobile station, and the third signal quality is received via a second transmission from the second access point.

12. In a communication system comprising a plurality of access points and a mobile station, wherein the mobile station is currently associated with a first access point, a method comprising the steps of, at a second access point:
   receiving a transmission at a given signal quality from the mobile station;
   signaling the first access point with the given signal quality in which the transmission was received from the mobile station when the given signal quality exceeds a predetermined threshold;
   sending a transmission to the mobile station to disassociate wit the first access point when a handoff trigger is received within a predetermined time period from the first access point; and
   transmitting a disassociation message to the mobile station, wherein the disassociation message is addressed as if it originated from the first access point.

13. The method of claim 12 further comprising the step of increasing the predetermined threshold when the handoff trigger is not received from the first access point within the predetermined time period.

14. The method of claim 12 further comprising the step of transmitting a message to the mobile station to disassociate from the first access point.

15. The method of claim 12 further comprising the step of signaling the first access point to forward any buffered packets destined for the mobile station after the step of transmitting.

* * * * *

UNITED STATES PATENT AND TRADEMARK OFFICE
CERTIFICATE OF CORRECTION

PATENT NO. : 7,058,030 B2 Page 1 of 1
APPLICATION NO. : 10/622048
DATED : June 6, 2006
INVENTOR(S) : Ekl et al.

It is certified that error appears in the above-identified patent and that said Letters Patent is hereby corrected as shown below:

Col. 6, line 17, change "wit" to --with--

Signed and Sealed this

Fourteenth Day of November, 2006

JON W. DUDAS
*Director of the United States Patent and Trademark Office*